April 9, 1968 W. LECHER 3,377,051
GUIDE APPARATUS FOR A HYDRAULIC MACHINE
Filed Sept. 1, 1966 2 Sheets-Sheet 1

INVENTOR
Walter Lecher

BY Dodge and Sons
ATTORNEYS

United States Patent Office 3,377,051
Patented Apr. 9, 1968

3,377,051
GUIDE APPARATUS FOR A
HYDRAULIC MACHINE
Walter Lecher, Zollikerberg, Switzerland, assignor to Escher Wyss Aktiengesellschaft, Zurich, Switzerland, a corporation of Switzerland
Filed Sept. 1, 1966, Ser. No. 576,693
Claims priority, application Switzerland, Oct. 8, 1965, 13,930/65
9 Claims. (Cl. 253—122)

ABSTRACT OF THE DISCLOSURE

A guide blade apparatus for a hydraulic machine comprising an annular series of pivoted blades which overlap in the closed position. Each blade, in the closed position, engages the adjacent blades along two sealing lines at opposite sides of its pivot axis, the sealing line on the trailing portion of the blade being spaced from the trailing edge a distance at least 4% of the chord length, and being spaced from the pivot axis a distance not greater than 1.25 times the distance between the pivot axis and the sealing line on the leading portion of the blade.

---

This invention relates to a guide apparatus for a hydraulic machine having an annular series of rotary guide blades which overlap each other in the closed position, and each of which is adapted to engage the adjacent blades along two sealing lines or narrow zones.

In such guide apparatus, which is used for high-pressure turbines and pump turbines and is known by the name of Fink rotary blades, the blades overlap in the closed position of the guide apparatus to ensure reliable guiding of the water even at small openings of the guide apparatus. A usual construction has an overlap ratio of about 1.16, i.e., the blade chord length is about 1.16 times the pitch of the blade series. The pivot for each blade is located in the leading, thicker part of the blade profile, and the closure ratio is about 1.5, that is to say, the distance between the sealing line at the trailing edge of the blade and the pivot axis is 1.5 times the distance between the sealing line adjacent the leading edge and said axis. In this construction, the blade is subjected to a maximum opening torque in the closed position, which is about 4 times the maximum closing torque which is imposed on it in the half-open position of the guide apparatus.

In constructions in which the guide blades are rotated by means of a regulating ring acting through straps and levers, the maximum torque peak occurring in the closed position is taken up by toggle lever action so that no considerable servomotor forces are necessary. However, if individual rotary servomotors are used, each motor must be designed for these large torque peaks.

In one known construction, the torque peak has been reduced by shifting the blade pivot toward the trailing edge of the blade. However, this change in the location of the pivot increases the maximum closing torque which acts on the blade when the guide apparatus is about half open. If the pivot is shifted only far enough to reduce the maximum opening torque to the level of the maximum closing torque, the last mentioned torque will be about double the maximum closing torque of a conventional blade having a closure ratio of 1.5. The situation is even worse when the pivot is moved to a position in which the opening torque is completely eliminated, because in this case the maximum closing torque is about three times the corresponding torque in the conventional structure. In addition to this disadvantage, shifting of the pivot into the narrow, trailing portion of the blade makes it difficult to achieve adequate blade strength.

Another possible method of reducing the torque peak in the closed position of the guide blades would be to shorten the chord length of each blade so as to reduce the distance between the trailing edge and the pivot. However, this measure also reduces the overlap and thus precludes reliable guiding of the water flow at small openings of the guide apparatus.

It is the aim of the invention to eliminate the disadvantages described and still obtain a favourable torque variation for all working positions of the guide apparatus. According to the invention, the sealing line on the trailing portion of each blade is spaced from the trailing edge a distance at least 0.04 times the chord length, and the distance between this sealing line and the pivot axis is at most 1.25 times the distance between the pivot axis and the sealing line on the leading portion of the blade. In this way, the opening torque occurring in the closed position may be reduced, caused to disappear, or even converted into a closing torque, without substantially increasing the maximum closing torque which occurs when the guide apparatus is half open.

Slight bevelling of the trailing edge in the longitudinal direction, amounting to about 0.02 times the chord length of the blade profile, is indeed already known in the art. However, this is not done to influence the torque, but is intended to provide definitely and primarily a blunter sealing edge which is less subject to wear.

Several embodiments of the invention are described herein with reference to the accompanying drawings in which.

Figure 1:
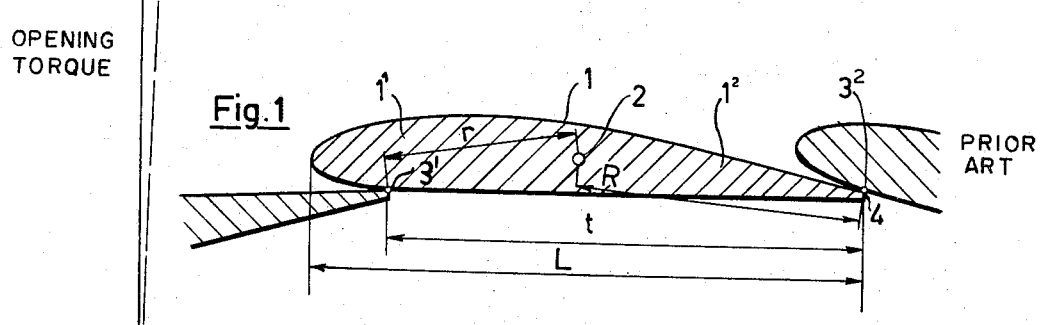
FIG. 1 is a sectional view, taken at right-angles to the guide blade pivot axes, through part of a known guide apparatus.

In the conventional guide apparatus shown in FIG. 1, the guide blades rotate about pivot axes 2 and are arranged in an annular series between a head water or upstream space and a bottom water or downstream space of the machine. Therefore, numerals $1^1$ and $1^2$ indicate, respectively, the leading and trailing portions of the blades. The blades 1 overlap one another, that is, the chord length L of each blade is greater than the pitch $t$ of the blade series, and, in the closed position, each blade engages the adjacent blades along two sealing lines located, respectively, on its leading and trailing portions $1^1$ and $1^2$. For the complete blade shown in FIG. 1, these lines are designated $3^1$ and $3^2$. Each of these sealing lines is located at the trailing edge 4 of one of the blades and, for each blade, the distance R between sealing line $3^2$ and pivot axis 2 is about 1.5 times the distance $r$ between this axis and the sealing line $3^1$.

Figure 2:
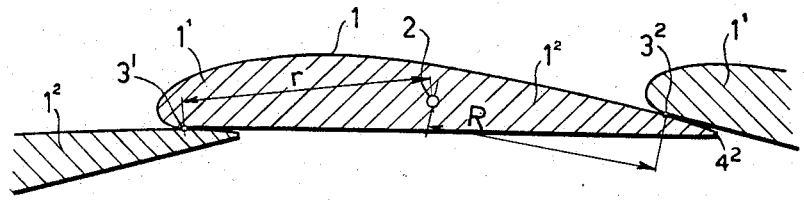
FIG. 2 is a corresponding section through a guide apparatus according to the invention.
Figure 3:
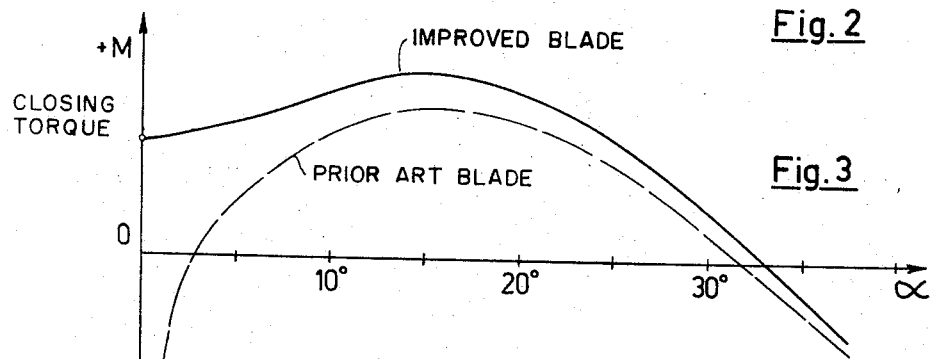
FIG. 3 is a graph of torque versus angle of opening of the guide blades which illustrates the changes in torque characteristics effected by the invention.

In the series of guide blades 1 according to the invention and shown in FIG. 2, the sealing line $3^2$ on the trailing portion $1^2$ of each blade is spaced from the trailing edge 4 a distance greater than 0.04 times the chord length L, and the distance R between the trailing sealing line $3^2$ and pivot axis 2 is less than 1.25 times the distance $r$ between this axis and the leading sealing line $3^1$. In particular, the spacing between the trailing sealing line $3^2$ and the edge 4 is 11% of the chord L, and the dimension R is less than the dimension $r$. The effect of these changes may be gathered from FIG. 3, which compares the torque characteristics of the conventional blade with those of an improved blade having substantially the same profile and overlap ratio, and the same location of the pivot 2 along the chord. This graph shows that the improved blade has a closing tendency throughout the normal working range which extends from an aperture angle of zero (i.e., the closed position) to about an opening angle of 33° (i.e., the upper floating point), and that the maximum torque is only immaterially greater than the maximum closing torque of the known blade. It also will be noticed that the very large opening torque which acts on the conventional blade in the closed position has been eliminated.

If the distance between the sealing line $3^2$ and the trailing edge 4 is only 5% of the chord length L, the improved blade will have a closure ratio $R/r$ of 1.15, assuming that the position of the pivot 2 along the chord remains unchanged. In this case, blade 1 will be subjected to a small opening torque in the closed position, but the magnitude of this torque is substantially the same as the magnitude of the maximum closing torque which is imposed when the blades are half open.

As indicated earlier, the trailing sealing line $3^2$ can be positioned to eliminate completely the torque acting on the blade 1 in the closed position. This effect is produced when the distance between the sealing line $3^2$ and the trailing edge 4 is about 8% of the chord. In this case, as well as the others, the magnitude of the maximum closing torque in the half-open position of the blades is not materially different from the magnitude of the corresponding torque imposed on the conventional blade.

Figure 4:
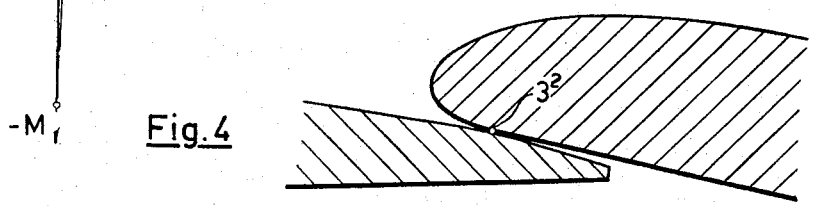
FIG. 4 is an enlarged view of a portion of the complete blade shown in FIG. 2.
Figure 5:
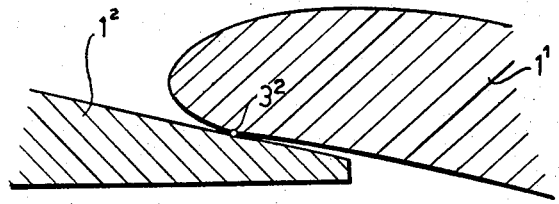
FIGS. 5 to 9 are partial sectional views similar to FIG. 4 but showing further embodiments of the invention.
Figure 6:
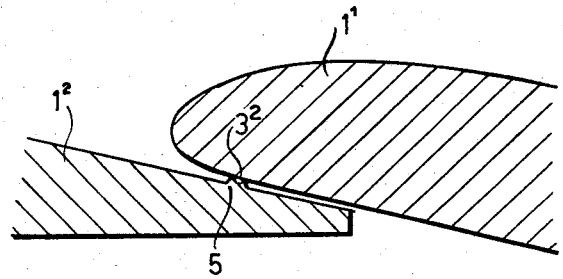
Figure 7:
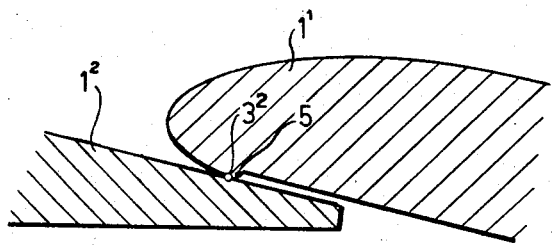
Figure 8:
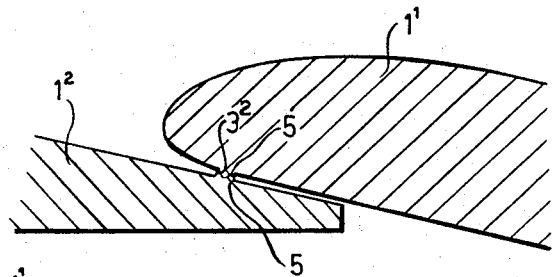
Figure 9:
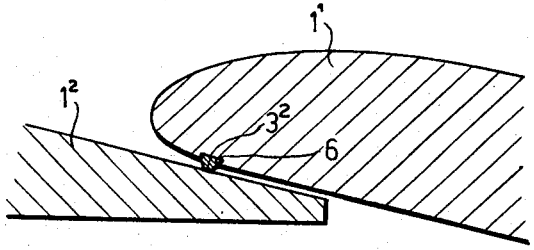

In the embodiment of the invention shown in FIGS. 2 and 4, the trailing portion $1^2$ of guide blade 1 is bevelled from the sealing line $3^2$ to the trailing edge 4 so that a pronounced edge is formed at the sealing line $3^2$. In the embodiment shown in FIG. 5, the profile of the trailing portion $1^2$ of blade 1 is flat, and it rests against an edge provided on the leading portion $1^1$ of the adjacent blade and located at sealing line $3^2$. The embodiments of FIGS. 6–8 employ one sealing band 5, or a pair of such bands, positioned in the region of sealing line $3^2$; the band 5 being on the trailing portion $1^2$ of each blade in FIG. 6, on the leading portion $1^1$ in FIG. 7, and on both of these portions in FIG. 8. In FIG. 9 the seal is effected by a band 6 of resilient material, such as rubber, which is set into the blade profile in the region of the sealing line. In view of these different constructions, it will be understood that the sealing lines referred to herein, and identified by small circles on the drawings, can be true lines or narrow strips or bands.

In all of the illustrated embodiments, it is assumed that the sealing lines extend along the entire height of the blade. However, if the guide blade does not have the same profile over the entire height, it will suffice in some cases to apply the invention to only a part of the height, provided only that it is borne in mind that the sum of the torques acting on the individual partial heights produces the desired effect.

The drawing shows sections through blades whose pivot axes are parallel with the axis of the hydraulic machine. However, the invention may also be used in guide apparatus in which the blade pivot axes extend obliquely, or at right-angles, to the axis of the hydraulic machine.

What I claim is:
1. A guide apparatus for a hydraulic machine comprising an annular series of pivotally mounted guide blades having a closed position in which they overlap one another and separate an upstream space from a downstream space of the machine,
 (a) each blade having a pivot axis and including leading and trailing portions located at opposite sides of said axis,
 (b) each blade, in the closed position, engaging the adjacent blades along two sealing lines located, respectively, on the leading and trailing portions,
 (c) the sealing line on the trailing portion of each blade being spaced from the trailing edge a distance at least 4% of the chord length of the blade and being spaced from the pivot axis a distance not greater than 1.25 times the distance between the pivot axis and the sealing line on the leading portion.

2. A guide apparatus as defined in claim 1 in which the spacing between the sealing line on said trailing portion and the trailing edge is at least 5% of the chord length.

3. A guide apparatus as defined in claim 1 in which the spacing between the sealing line on said trailing portion and the trailing edge is at least 8% of the chord length.

4. A guide apparatus as defined in claim 1 in which the distance between the sealing line on said trailing portion and the pivot axis is not greater than 1.18 times the distance between the pivot axis and the sealing line on said leading portion.

5. A guide apparatus as defined in claim 1 in which the distance between the sealing line on said trailing portion and the pivot axis is less than the distance between the pivot axis and the sealing line on said leading portion.

6. A guide apparatus as defined in claim 1 in which, at each sealing line, there is a beading projecting from the profile of at least one of the blades.

7. A guide apparatus as defined in claim 1 in which each blade is bevelled from the sealing line on said trailing portion to the trailing edge so as to form an edge at that sealing line.

8. A guide apparatus as defined in claim 1 in which each blade has a sealing edge located at the sealing line on its leading portion, and this sealing edge rests on the trailing portion of the adjacent blade in the closed position.

9. A guide apparatus as defined in claim 1 in which, at each sealing line, one of the blades is provided with a sealing band of resilient material.

References Cited
UNITED STATES PATENTS

| 1,472,924 | 11/1923 | Lyndon | 253—122 |
| 1,688,736 | 10/1928 | Moody | 253—122 |
| 1,750,400 | 3/1930 | Gibbs et al. | 253—122 |
| 2,291,110 | 7/1942 | Sharp | 253—122 |

FOREIGN PATENTS

| 454,314 | 4/1928 | Germany. |
| 501,615 | 3/1939 | Great Britain. |

EVERETTE A. POWELL, JR., *Primary Examiner.*

MARTIN P. SCHWADRON, EDGAR W. GEOGHEGAN, *Examiners.*